(12) United States Patent
Lecomte et al.

(10) Patent No.: US 11,383,314 B2
(45) Date of Patent: Jul. 12, 2022

(54) TOOL FOR MACHINING FESTOONS AND ATTACHMENT HOLES OF A DISC FLANGE BY PECM AND METHOD USING THIS TOOL

(71) Applicant: SAFRAN AIRCRAFT ENGINES, Paris (FR)

(72) Inventors: Janvier François Lecomte, Moissy-Cramayel (FR); Estelle Michèle Nicole Auvray, Moissy-Cramayel (FR); Sophie Anne-Laure Tallon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/268,771

(22) PCT Filed: Aug. 28, 2019

(86) PCT No.: PCT/FR2019/051982
§ 371 (c)(1),
(2) Date: Feb. 16, 2021

(87) PCT Pub. No.: WO2020/043989
PCT Pub. Date: Mar. 5, 2020

(65) Prior Publication Data
US 2021/0178501 A1 Jun. 17, 2021

(30) Foreign Application Priority Data

Aug. 31, 2018 (FR) ...................................... 1857838

(51) Int. Cl.
*B23H 9/10* (2006.01)
*B23H 3/04* (2006.01)
(Continued)

(52) U.S. Cl.
CPC ................. *B23H 9/10* (2013.01); *B23H 3/04* (2013.01); *B23H 3/10* (2013.01); *F01D 5/025* (2013.01); *F05D 2230/11* (2013.01)

(58) Field of Classification Search
CPC .......... B23H 9/10; B23H 3/04; F05D 2230/11
See application file for complete search history.

(56) References Cited

U.S. PATENT DOCUMENTS

2015/0330224 A1* 11/2015 Casaliggi ................ F16F 15/32
29/889.6

FOREIGN PATENT DOCUMENTS

| FR | 3006925 A1 | 12/2014 |
| FR | 3042138 A1 | 4/2017 |

OTHER PUBLICATIONS

French Search Report in FR Application No. 1857838, dated Jul. 3, 2019, (2 pages).

(Continued)

*Primary Examiner* — Nicholas A Smith
(74) *Attorney, Agent, or Firm* — Bookoff McAndrews, PLLC.

(57) ABSTRACT

Tooling for producing scallops and fastening holes of a clamp of a disc by electrochemical machining using an electrolyte, the tooling having: an annular support tray to receive the disc; lower and upper shields configured to protect the disc from splashes of the electrolyte; a clamping lock to hold the disc in position during machining; and a die-sinking tool having in a substantially cylindrical insulating body a first and a second coaxial conductive cathode, the first and second cathodes rigidly fastened to each other, the first annular cathode including at an external periphery a plurality of radial machining protrusions of a shape complementary to that of the scallops to be machined and the second cathode includes, on the same circumference external to the first cathode relative to the central axis of the (Continued)

disc, a plurality of axial machining nozzles of a shape similar to the fastening holes to be machined.

10 Claims, 4 Drawing Sheets (51) Int. Cl.
*B23H 3/10* (2006.01)
*F01D 5/02* (2006.01)

(56) References Cited

OTHER PUBLICATIONS

International Search Report issued in International Application No. PCT/FR2019/051982, dated Nov. 22, 2019 (2 pages).
F. Klocke et al., "Turbomachinery component manufacture by application of electrochemical, electro-physical and photonic processes," CIRP ANNALS, vol. 63, No. 2, Jul. 2, 2014, pp. 703-726 (24 pages).

* cited by examiner

TOOL FOR MACHINING FESTOONS AND ATTACHMENT HOLES OF A DISC FLANGE BY PECM AND METHOD USING THIS TOOL

CROSS-REFERENCE TO RELATED APPLICATION(S)

This application is the U.S. national phase entry under 35 U.S.C. § 371 of International Application No. PCT/FR2019/051982, filed on Aug. 28, 2019, which claims priority to French Patent Application No. 1857838, filed on Aug. 31, 2018.

BACKGROUND OF THE INVENTION

The present invention concerns a tooling for producing turbine disc clamps by electrochemical machining and a method using such a tooling.

The production of turbine discs has long been achieved by broaching or milling, then deburring and radiusing of the sharp edges. Thus, several machining operations are therefore necessary for such a production. In addition, the release of the stresses in the material during these operations generates deformations that require creating additional machining steps and intermediate controls to maintain the final geometric tolerances required for a turbine disc, which has the consequence of greatly increasing the cycle time. There are also risks of deformations induced by the stresses resulting from the cutting forces, in particular during the phases of drilling the disc clamps of small-thickness.

Also, in order to overcome these drawbacks and further ensure automation and robustness of the deburring and the radiusing of the sharp edges and allow an elimination of the manual finishing operations, it is known to resort to the electrochemical machining and more particularly to the pulsed electrochemical machining (PECM). Document FR 3 006 925 describes a device and a method using this technical solution for the production of cells on a single-stage turbine part.

A relatively simple and low-cost tooling which allows the machining of multi-stage disc cells in a relatively short time is also known from document FR 3 042 138. This tooling, which is generally satisfactory, is however not suitable for producing the scallops and fastening holes of a turbine disc clamp.

OBJECT AND SUMMARY OF THE INVENTION

Also, there is today an unmet need to simultaneously produce the scallops and fastening holes of a turbine disc clamp by pulsed electrochemical machining by means of a simple tooling, and this in a relatively short time.

Such a tooling would indeed have the advantage of an absence of mechanical stress due to anodic oxidation of the material, to a natural radiusing of the edges and to an absence of burrs generated by the PECM process such as wear of the die-sinking tool (only the renewal of the electrolyte is to be carried out).

This objective is achieved thanks to a tooling for producing scallops and fastening holes of a clamp of a disc by electrochemical machining using an electrolyte, the tooling comprising: an annular support tray to receive said disc; lower and upper shields configured to protect said disc from splashes of the electrolyte; a clamping lock to hold said disc in position during the machining; and a die-sinking tool comprising in a substantially cylindrical insulating body first and second coaxial conductive cathodes, said first and second cathodes being rigidly fastened to each other, characterized in that the first annular cathode includes at an external periphery a plurality of radial machining protrusions of a shape complementary to that of the scallops to be machined and the second cathode includes, on the same circumference external to said first cathode relative to the central axis of the disc, a plurality of axial machining nozzles of a shape similar to that of the fastening holes to be machined.

By "rigidly fastened to each other" it is understood that the first and second cathodes are fastened so that, when the die-sinking tool moves, these first and second cathodes move simultaneously and in an identical manner. The shape of the radial machining protrusions, in axial view along the axis of the disc, corresponds to the shape of the scallops to be produced on the clamp of the disc and the shape and arrangement on the same circumference of the axial machining nozzles correspond to the shape and arrangement of the fastening holes to be produced in the clamp. Furthermore, to within a few tenths of millimeters corresponding to the working interval (lateral gap) between the part and the tool, the outer radii of the protrusions of the first cathode are equal to the outer radii of the scallops of the clamp, and the outer diameter of the nozzles of the second cathode is equal to the inner diameter of the fastening holes of the clamp. Consequently, when the die-sinking tool moves along the axis of the disc, the first cathode allows producing the scallops of the clamp by electrochemical machining, and the second cathode allows producing the fastening holes of the clamp by electrochemical machining.

The tooling allows machining the holes and the scallops of the disc clamp (or vice versa depending on the respective position of the first and second cathodes along the axis of the disc) by two successive electrochemical machining sequences carried out by means of the single die-sinking tool defined above.

Advantageously, said plurality of radial machining protrusions has at one terminal end a working portion of a thickness e1 comprised between 0.2 and 1 mm, and each of said axial machining nozzles has at one terminal end a working portion in the form of a cylindrical conductive plate of a thickness e2 comprised between 0.2 and 1 mm, and in that, to allow the diffusion of the electrolyte, each of the radial machining protrusions includes a terminal orifice and the conductive plate includes an orifice.

During machining, according to the PECM process, an electrolyte is injected which flows along the protrusions or through the nozzles; and simultaneously, a pulsed electric current is circulated from the disc portion to be machined to the corresponding active cathode; the passage of this current allows an ionic breaking of the metal atoms causing a removal of material in the disc portion located in front of the active cathode, so that the scallops, respectively the fastening holes, of the clamp present, after machining, the shape defined by the protrusions, respectively the nozzles, of the active cathode.

Preferably, the insulating body of the die-sinking tool further includes fluid injection passages for injecting the electrolyte through the radial machining protrusions and the axial machining nozzles.

Advantageously, the lower and upper shields each consist of a rigid conductive part in direct contact with a surface of the disc clamp to be machined and especially configured to ensure the passage of the first and second cathodes without risks of contact therewith. The lower shield is preferably formed in several portions to allow its insertion under the clamp to be machined.

According to one advantageous embodiment, in order to obtain radiusing at the inlet of the scallops as well as chamfers at the inlet of the fastening holes, an axial spacing comprised between 0.2 mm and 0.8 mm, and typically 0.5 mm, is provided between the upper shield and an upper face of the disc clamp.

Preferably, the clamping lock includes a lower portion calibrated on an internal diameter of a balancing element of the disc so as to ensure an axial centering of this disc, this lower portion including a rim for clamping the disc with the lower shield previously in position.

Advantageously, two annular seals are mounted, on the one hand, between the upper shield and an upper disc clamp and, on the other hand, between an upper portion of the clamping lock and the die-sinking tool and allow ensuring an electrolyte sealing during the die-sinking of the first and second cathodes.

The present disclosure also concerns a method for producing scallops and fastening holes of a disc clamp by electrochemical machining by means of a die-sinking tool comprising in a substantially cylindrical insulating body first and second coaxial cathodes, the method including the following steps:

a) Positioning the die-sinking tool so that the first cathode is in the vicinity of an upper surface of the disc clamp to be machined, b) Machining with the first cathode the scallops (or the holes) the disc clamp by electrochemical machining by moving the die-sinking tool relative to the disc along the central axis of the substantially cylindrical insulating body until the second cathode of the die-sinking tool is positioned in the vicinity of an upper surface of said disc clamp to be machined, c) Machining with the second cathode the holes (or the scallops) the disc clamp by electrochemical machining by moving the die-sinking tool relative to the disc along the central axis of the substantially cylindrical insulating body.

Preferably, the lower and upper surfaces of the disc clamp, other than those involved in the method, are protected by respectively lower and upper shields each consisting of a rigid conductive part in direct contact with the surfaces to be protected and made of a material with better conductivity than the material of the disc clamp to be machined.

BRIEF DESCRIPTION OF THE DRAWINGS

The invention and its advantages will be better understood upon reading the detailed description given below of various embodiments of the invention given by way of non-limiting examples. This description refers to the pages of appended figures, on which.

DETAILED DESCRIPTION OF EXEMPLARY EMBODIMENTS

Figure 1:
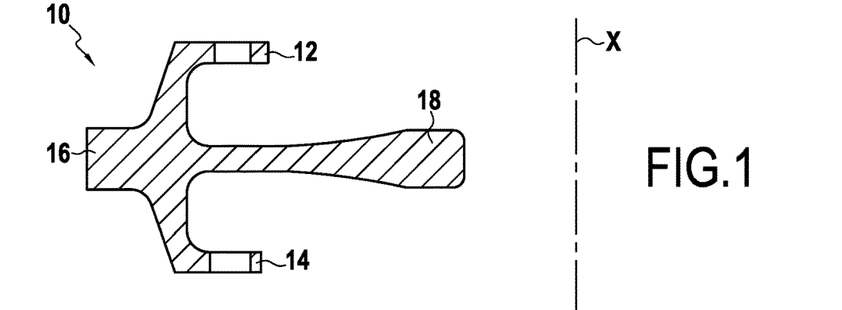
FIGS. 1 and 1A represent sectional and detailed views of a turbine disc portion.
Figure 1A:
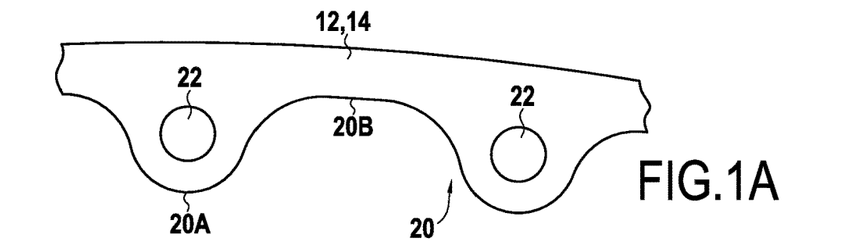

FIG. 1 represents a sectional view of a turbine disc 10 of central axis X after machining, including an upper disc clamp 12 of a first diameter, a lower disc clamp 14 of a second diameter which may or may not be identical to the first one, the two clamps meeting at an annular serration 16 defining the cells of the disc and extending towards the central axis of the disc by a balancing element 18. As shown in detail in FIG. 1A, each of these two clamps has at its periphery a plurality of scallops 20 formed of a series of protruding 20A and recessed arcs 20B, each of the protruding arcs being drilled with a fastening hole 22.

Figure 2A:
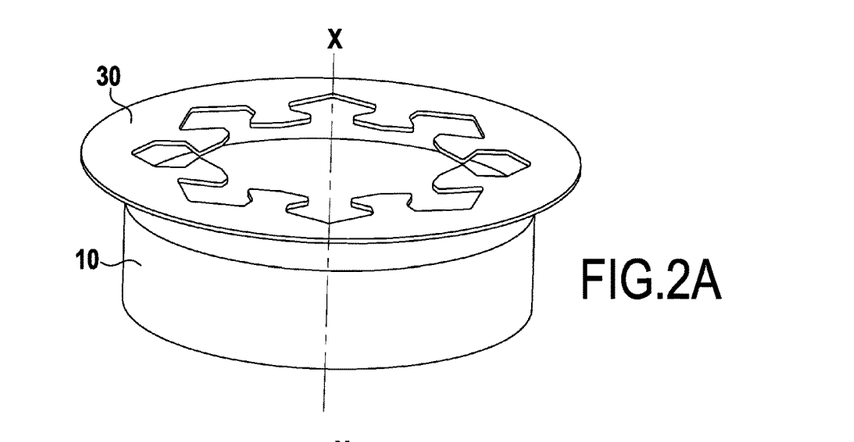
FIGS. 2A and 2B are simplified representations of a disc, respectively before machining its honeycomb serration and after machining its honeycomb serration.
Figure 2B:
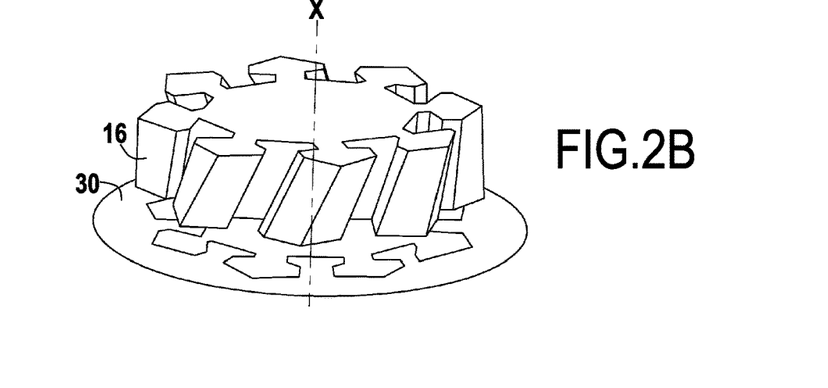

FIGS. 2A and 2B are simplified schematic representations of a disc 10 before machining its honeycomb serration 16 (FIG. 2A), and after machining this honeycomb serration (FIG. 2B), by the process known as Pulsed Electrical Chemical Machining (PECM) method.

The PECM process, which ensures an electrochemical machining with a maximum accuracy of ±10 μm, uses a pulsed current whose frequency is comprised between 10 and 120 Hz associated with a sinusoidal oscillatory movement of 0.1 to 0.5 mm of a die-sinking cathode 30. This die-sinking cathode, of a shape complementary to the disc to be machined, is traversed by a pulsed current, and a pressurized electrolyte circulates between this cathode 30 and the disc 10 to be machined which are always separated by a minimum working interval. Initially, the cathode 30 is in high position, that is to say above the disc 10 (FIG. 2A), and it is then translated in the direction of the disc 10 along the axis thereof, taking, in the illustrated case, a helical path relative thereto. When the cathode reaches the level of the disc, successive current pulses are triggered in the electrolyte and an ionic dissolution occurs due to the anode-cathode interaction. At the end of its translation, the cathode 30 is in a low position, that is to say below the disc 10 (FIG. 2B), which marks the end of the machining.

Figure 3:
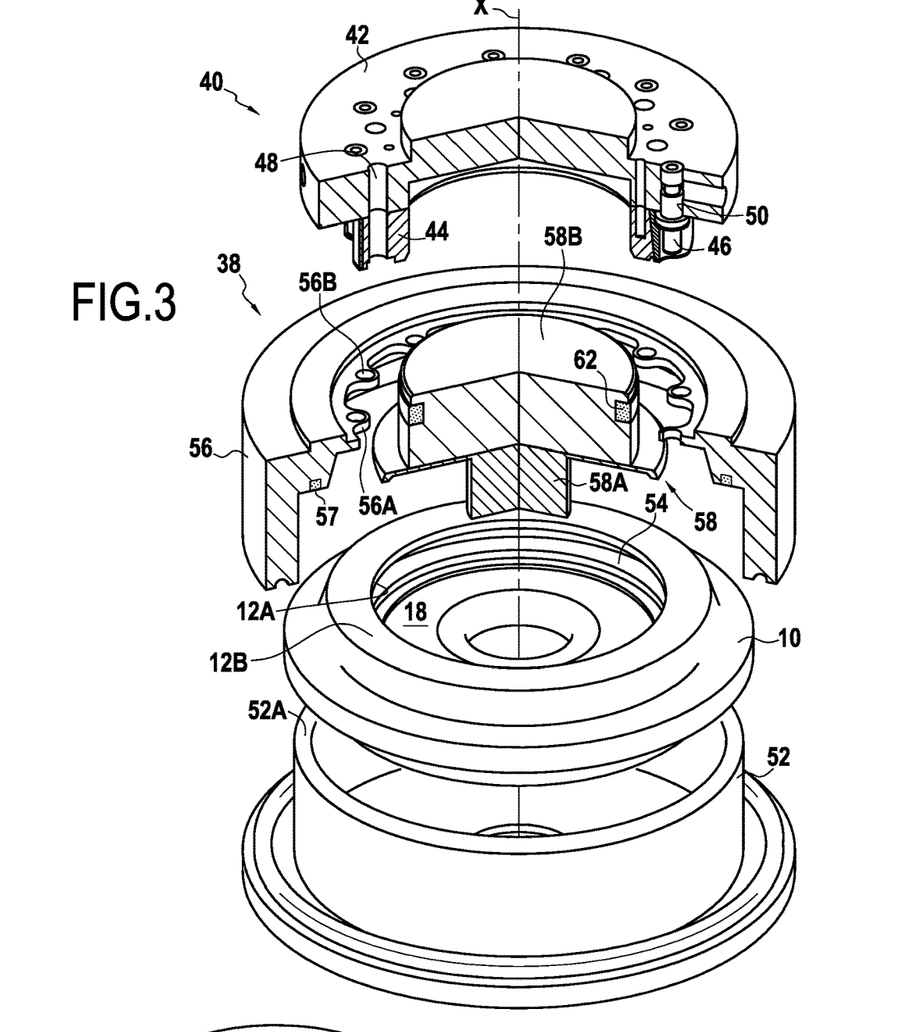
FIG. 3 represents an exploded view of the tooling for producing scallops and holes of a turbine disc clamp.

This machining principle is used by a fixed tooling 38, in accordance with the invention, which is illustrated in exploded form in FIG. 3. This tooling which is arranged axisymmetrically about the central axis of the disc 10 allows machining in a single operation both the scallops 20 and the fastening holes 22 of a disc clamp. A die-sinking tool 40 which will be detailed later and which includes a body made of preferably cylindrical insulating material 42 from which emerges a set of die-sinking cathodes 44, 46 capable of successively machining in two distinct steps the scallops and the fastening holes, is represented disposed above the disc 10 and is configured to be able to move relative to the latter, along the central axis of the disc. The cathodes and/or the die-sinking tool are traversed by respective axial fluid injection passages 48, 50 through which the tooling is supplied with electrolyte. The separate current intake for the die-sinking cathodes 44 and 46 is ensured by screw connections (not represented) also allowing fastening these cathodes to the insulating body.

The tooling 38 intended to receive this die-sinking tool 40 is composed for its part of a support tray 52 in the form of height-calibrated annulus, of a "lower" shield 54, of an "upper" shield 56 and of a clamping lock 58. The concepts of upper and lower are to be considered in relation to the direction of machining of the die-sinking tool along the central axis of the disc which, while moving, will first meet the upper shield 56 then the disc to be machined 10 and finally the lower shield 54.

The annular support tray 52 is intended to receive the part to be machined and to serve as a reference bearing for this part. More specifically, it is the end portion 16 intended to form the cells of the disc that is brought to bear on a height-calibrated flange 52A of the annulus in the example illustrated (however a bearing on at least three, preferably six, evenly distributed calibrated pads can also be envisaged).

The lower shield 54 is a rigid conductive part, in the form of a bushing with a curved flange, also arranged axisymmetrically about the central axis of the disc and in direct contact (that is to say at the same potential as the part to be machined) with a lower surface 12A of the clamp to be machined, the shape of which it partially matches (the flange of this bushing does not extend to cover the scallops of the clamp once it has been machined). It is designed in several portions (at least two and preferably four portions) to facilitate its insertion under the clamp of the disc. The shape and positioning of this lower shield are configured to ensure passage of the cathodes without risks of contact therewith (a radial clearance of approximately 0.2 mm is thus appropriate). In order to mask the surfaces which could be in contact with the contaminated electrolyte and to effectively protect from electrolytic etchings all the surfaces located under the clamp on which the electrolyte could stream, this conductive part is inserted between the balancing element 18 and the upper clamp 12 of the disc. By this galvanic shield, the bare surfaces near the shield are not subjected to electrolytic etchings that could damage the part.

The upper shield 56 is a rigid conductive part, in the form of a cap, also arranged axisymmetrically about the central axis of the disc and in direct contact (that is to say at the same potential as the part to be machined) with an upper surface 12B of the clamp to be machined, its periphery however having scallops 56A and holes 56B whose shapes and dimensions correspond to those of the clamp to be machined. The shape and positioning of this shield are configured to ensure the passage of the cathodes without risks of contact therewith (a maximum radial clearance of 0.5 mm is suitable for the holes and of approximately 0.2 mm for the scallops to avoid direct contact with the cathodes). As previously, by this galvanic shield, the bare surfaces near this conductive part are not subjected to uncontrolled electrolytic etchings which would otherwise risk damaging the part. In addition, a first circular seal 57 mounted in the upper shield at the junction with the upper surface 12B of the clamp allows ensuring an electrolyte sealing during the die-sinking of the cathodes.

Figure 5A:
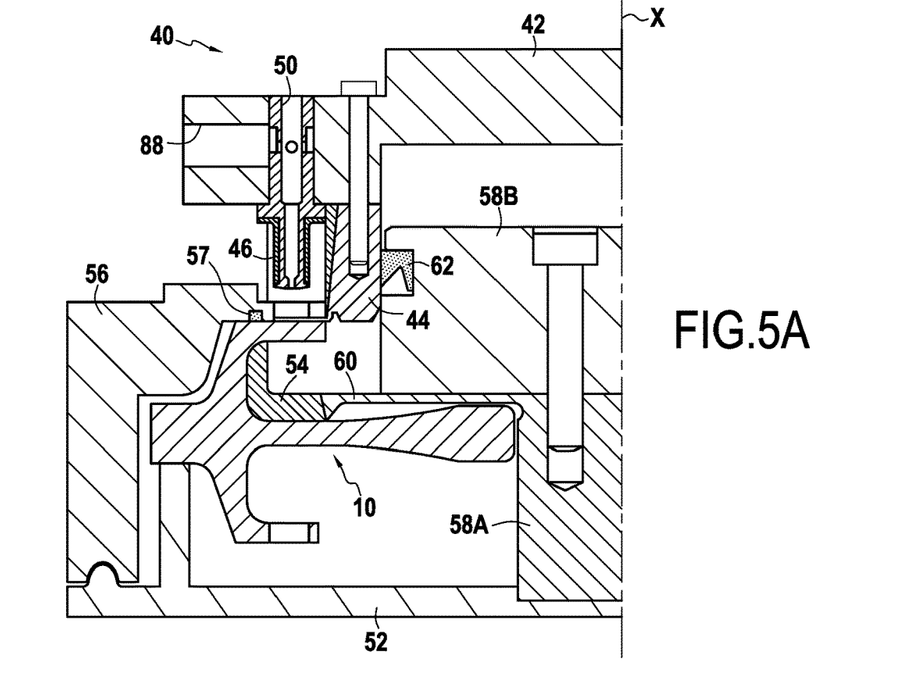
FIGS. 5A to 5C represent three successive positions of the die-sinking tool relative to the tooling during the electrochemical machining.
Figure 5B:
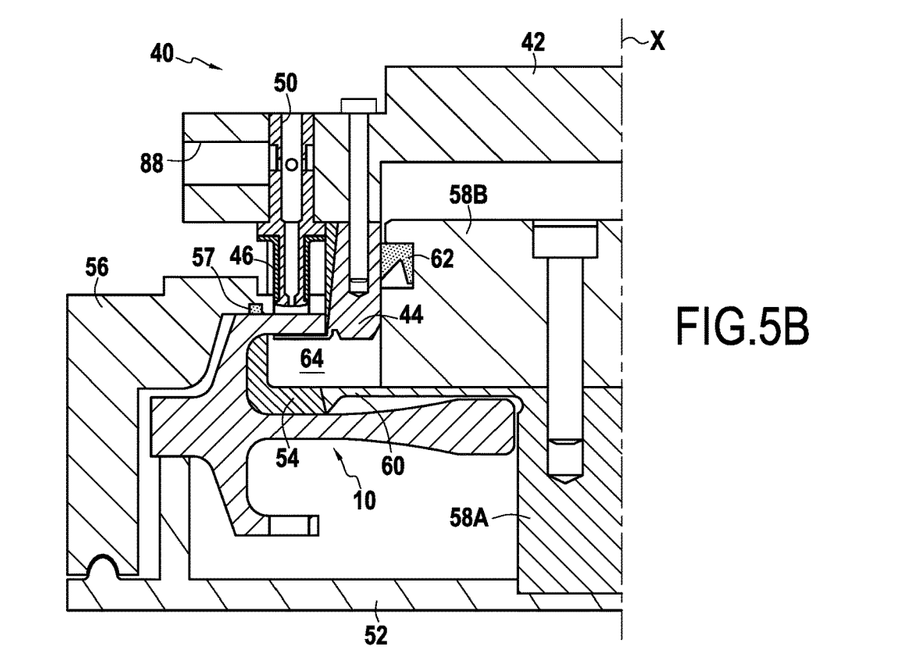
Figure 5C:
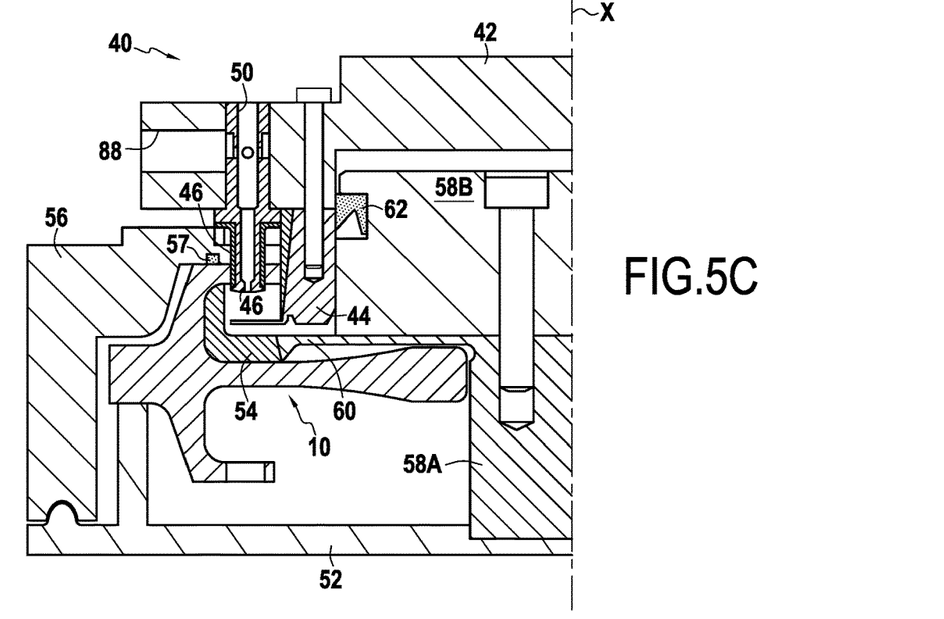

The clamping lock 58 is preferably composed of two portions fastened together (by screwing as illustrated in FIGS. 5A to 5C or any other equivalent means) after their positioning on the disc, in order to facilitate its installation and its fastening. This lock includes a lower portion 58A acting as a centralizer which is calibrated on the internal diameter of the balancing element 18 so as to axially center the disc 10. This lower portion also includes a rim 60 for clamping the disc with the lower shield 54 previously in position and held under the lower surface of this rim. An upper portion made of insulating material 58B of the clamping lock allows ensuring an electrolyte sealing by a second circular seal 62, of the lip seal type, upon die-sinking of the cathodes, so as to create a closed working chamber 64 in which the contaminated electrolyte will then accumulate temporarily before coming out of the tooling around the cathodes by back pressure effect.

Figure 3A:
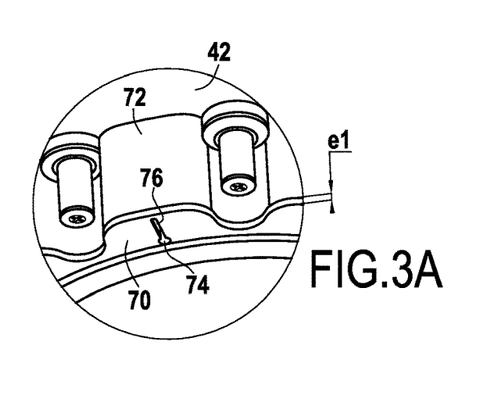
FIGS. 3A and 3B show details of the die-sinking tool of FIG. 3.
Figure 3B:
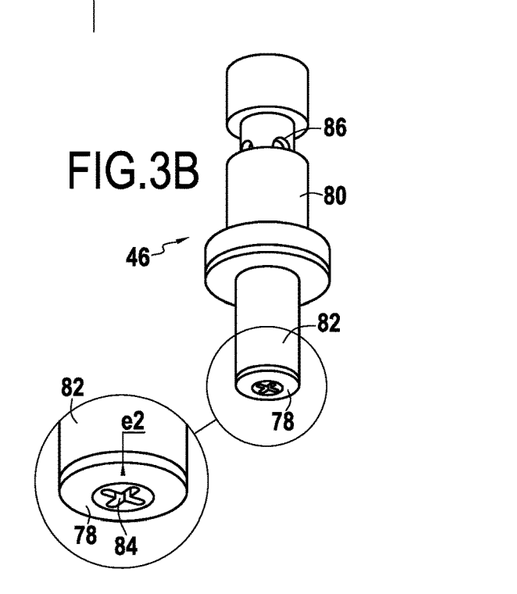

FIGS. 3A and 3B show details of the first and second cathodes of the die-sinking tool 40.

The first cathode 44 has the shape of a conductive annular ring including at its terminal end a working portion of a thickness e1 comprised between 0.2 and 1 mm (preferably less than 0.7 mm to avoid taper effects on the machined shapes) and whose external periphery is formed by a plurality of radial machining protrusions 70 of a shape complementary to those of the scallops 20 to be machined. At this external periphery is disposed an insulating portion 72 of the same shape (this insulating material must of course be compatible with the electrolyte) in contact axially with the cylindrical insulating body 42 and whose height defines the position along the axis of the disc of this first cathode 44. The conductive ring and the cylindrical insulating body are drilled by the electrolyte injection passages 48 (see FIG. 3) which open out into a terminal aperture 74, a slot 76 of which ending therein, both made in each of the radial machining protrusions and allowing diffusion of the electrolyte. The fastening of the ring in the cylindrical insulating body 42 is for example carried out by means of screws (see FIGS. 5A to 5C).

The second cathode 46 consists of a plurality of axial machining nozzles disposed outside the first electrode (relative to the central axis of the disc) on a same circumferential line. Each nozzle illustrated in FIG. 3B has at its terminal end a working portion in the form of a cylindrical conductive plate 78 of a thickness e2 comprised between 0.2 and 1 mm (preferably less than 0.3 mm to avoid taper effects on the machined shapes) and whose diameter corresponds to that of the holes 22 to be machined. This conductive plate constitutes the end of the conductive cylindrical body 80 of each nozzle covered with an insulating portion 82 of the same shape (this insulating material must of course be compatible with the electrolyte) and whose height is at least equal to that added of the upper shield and the holes to be machined. The conductive cylindrical body is drilled by the electrolyte injection passage 50 which opens out into an orifice, for example in the form of a cross 84, made in the conductive plate 78 and allowing the diffusion of the electrolyte. Radial orifices 86 passing through these nozzles and disposed substantially in the extension of radial passages 88 of the cylindrical insulating body 42 of the die-sinking tool, are provided for the distribution of the electrolyte in the drilling cathodes. The fastening of the nozzles in the cylindrical insulating body 42 is carried out in the axis of the nozzle, for example by means of screws (not represented).

Consequently, when the scallops or the fastening holes are being machined, the first and second cathodes are successively supplied with electrolyte from the injection passages 48 and 88 made in the insulating body 42 of the die-sinking tool 40 and via the diffusion orifices 74, 76 and 84 at the axial end of these cathodes. The electrolyte can then stream around the protrusions and at the end of the nozzles, before being discharged by simple back pressure effect. The lower and upper shields allow protecting the portions of scallops or fastening holes which have just been machined by a preferential etching of the contaminated electrolyte on the conductive shields with conductivity lower than the material of the part to be machined and thus avoiding uncontrolled electrolytic etchings of these non-machined portions, consequently preserving the quality of the machining.

Figure 4:
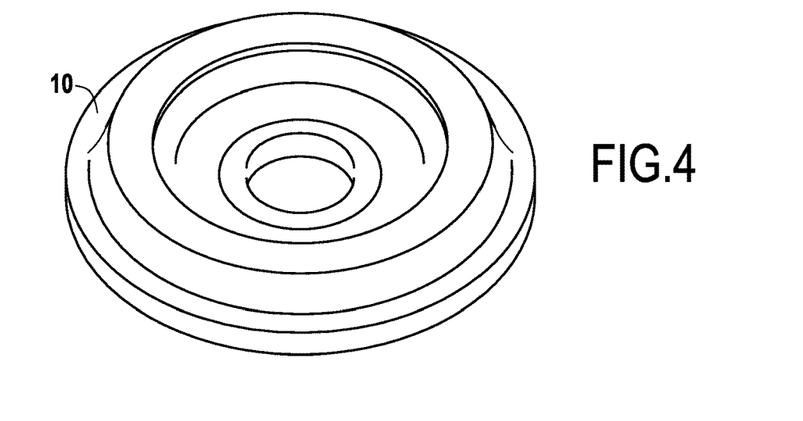
FIG. 4 represents a disc clamp before electrochemical machining.
Figure 6:
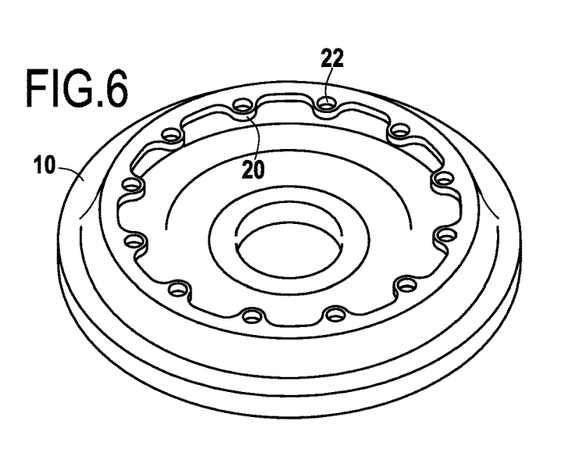
FIG. 6 represents a disc clamp after electrochemical machining.

The machining of a clamp of the disc which is now illustrated in relation to FIGS. 4 to 6 is done as follows, FIG.

4 illustrating the blank part before machining and FIG. 6 the finished part after machining.

The disc 10 to be machined as illustrated in FIG. 4 is first placed on the annular support tray 52. It is then protected (i.e. the portions of the clamp other than those to be machined) from the electrolyte both internally by placing the lower shield 54 which is held in position by the rim 60 of the lower portion 58A of the clamping lock 58 centered on the balancing element 18 and externally by placing the upper shield 56. The upper portion 58B of the clamping lock completes the mounting of the tooling 38 which is then ready to receive the die-sinking tool 40 which will surround the upper portion 58B of this clamping lock and thus close it, preferably in a sealed manner considering the presence of the circular seals 57, 62, in the manner of a cover.

Initially (FIG. 5A), this die-sinking tool 40 is placed in the tooling 38 such that the first cathode 44 is in the vicinity of the upper surface 12B of the disc clamp (substantially below the circular seal 62). To do so, this first cathode 44 is placed at a distance of 0.01 to 0.2 mm above this upper surface, along the central axis of the disc. The second cathode 46 is then positioned set back from this upper surface as from that of the upper shield, at an axial distance quite away from the fastening holes 22.

The phase of machining the scallops 20 can then begin by controlling the relative displacement along the central axis of the disc of the die-sinking tool 40 relative to the disc 10 fixedly held in the tooling 38, the first cathode 44 being simultaneously supplied with current and electrolyte by any appropriate known means by ensuring the electrochemical machining of the scallops during the descent of the tool. The electrolyte pressure is advantageously comprised between 2 and 10 bars and the current density comprised between 50 $A/cm^2$ and 300 $A/cm^2$. The displacement of the die-sinking tool is for its part achieved by any suitable known means with a die-sinking speed comprised between 0.15 mm and 0.5 mm/minute. This machining of the scallops is complete when the first cathode has protruded from below the lower surface 12A of the disc clamp (FIG. 5B). The supply of the first cathode with electrolyte and current to is then cut off.

In this machining-end position of the first cathode, the second cathode 46 is then positioned in the recessed portions of the scallops 56A of the upper shield at a distance of 0.01 to 0.2 mm above the upper surface 12B of the disc clamp, along the central axis of this disc, such that it is directly positioned in the vicinity of the fastening holes 22 to allow the engagement of the machining phase of these holes 22.

In this second phase, it is the second cathode 46 that is in turn supplied with current and electrolyte, so that the electrochemical machining of these holes 22 can be carried out immediately or not (a dead time is preferably provided for switching the power supply). As for the command of the displacement of the die-sinking tool along the central axis of the disc, it has not been interrupted even if such an interruption can of course be envisaged, for example if the electrolyte is regenerated at the end of this first machining phase. The machining of the holes is complete when the second cathode has protruded from below the lower surface 12A of the disc clamp (FIG. 5C). The supply of the second cathode with electrolyte and current to is then cut-off, as is the command of the displacement of the die-sinking tool. The machining of the clamp of the disc is thus completed and is presented as illustrated in FIG. 6 with its succession of scallops 20 and fastening holes 22.

When the disc 10 has a symmetrical configuration relative to the balancing element 18 as illustrated, it suffices to turn over the disc to machine the second clamp (this reversal has already been carried out in the figures presented which show the machining of this second clamp). When this symmetry does not exist, it is advisable to provide lower and upper shields adapted to the shape of the clamp to be machined and to adapt the dimensions of the tool accordingly, that is to say in practice the position of the cathodes relative to the central axis of the disc.

It will be noted that, where appropriate, a radiusing at the inlet and at the outlet of the scallops 20 can be ensured by a speed reduction with a static machining time of a few seconds depending on the value of desired radius. Without speed reduction, it is also possible to provide for an axial spacing of a few tenths of millimeters (preferably comprised between 0.2 mm and 0.8 mm and typically 0.5 mm) between the upper shield 56 and the upper face of the clamp 12B, for obtaining the radiusing at the inlet of the scallops as well as the chamfers at the inlet of the fastening holes 22.

Although the present invention has been described with reference to the machining of the clamp of a turbine disc, it is obvious that modifications and changes can be made without departing from the general scope of the invention as defined by the claims. For example, the die-sinking tool can of course be adapted by modifying the respective height-positioning of the two cathodes to produce the holes before the scallops and not the opposite. Likewise, the lower shield, like the upper shield, can include scallops and holes to best match the shape of the clamp. Similarly, if the maintenance of the contaminated electrolyte has been described in a closed chamber throughout the duration of the machining, it is obvious that a closed circuit of circulation of the electrolyte allowing its intake into and its discharge from this chamber can also be envisaged without particular difficulty by those skilled in the art. Thus, individual characteristics of the different illustrated/mentioned embodiments can be combined in additional embodiments. Consequently, the description and the drawings should be considered in an illustrative rather than a restrictive sense.

It is also obvious that all the characteristics described with reference to one method can be transposed, alone or in combination, to one tooling, and conversely, all the characteristics described with reference to one tooling can be transposed, alone or in combination, to one method.

The invention claimed is:

1. A tooling for producing scallops and fastening holes of a clamp of a disc by electrochemical machining using an electrolyte, the tooling comprising: an annular support tray to receive said disc; lower and upper shields configured to protect said disc from splashes of the electrolyte; a clamping lock to hold said disc in position during the machining; and a die-sinking tool comprising in a substantially cylindrical insulating body a first and a second coaxial conductive cathode, said first and second cathodes being rigidly fastened to each other, characterized in that the first annular cathode includes at an external periphery a plurality of radial machining protrusions of a shape complementary to that of the scallops to be machined and the second cathode includes, on the same circumference external to the first cathode relative to the central axis of the disc, a plurality of axial machining nozzles of a shape similar to that of the fastening holes to be machined.

2. The tooling for producing scallops and fastening holes of the clamp of the disc by electrochemical machining according to claim 1, wherein said plurality of radial machining protrusions has at one terminal end a working portion of a thickness e1 comprised between 0.2 and 1 mm, and each of said axial machining nozzles has at one terminal end a working portion in the form of a cylindrical conductive plate of a thickness e2 comprised between 0.2 and 1 mm, and wherein, to allow the diffusion of the electrolyte, each of the radial machining protrusions includes a terminal aperture and the conductive plate includes an orifice.

3. The tooling for producing scallops and fastening holes of the clamp of the disc by electrochemical machining according to claim 1, wherein the insulating body of the die-sinking tool further includes fluid injection passages for injecting the electrolyte through the radial machining protrusions and the axial machining nozzles.

4. The tooling for producing scallops and fastening holes of the clamp of the disc by electrochemical machining according to claim 1, wherein the lower and upper shields each consist of a rigid conductive part in direct contact with a surface of the disc clamp to be machined and specially configured to ensure the passage of the first and second cathodes without risks of contact therewith and wherein the lower shield is formed in several portions to allow its insertion under the clamp to be machined.

5. The tooling for producing scallops and fastening holes of the clamp of the disc by electrochemical machining according to claim 1, wherein, in order to obtain radiusing at the inlet of the scallops as well as chamfers at the inlet of the fastening holes, an axial spacing comprised between 0.2 mm and 0.8 mm is provided between the upper shield and an upper face of the disc clamp.

6. The tooling for producing scallops and fastening holes of the clamp of the disc by electrochemical machining according to claim 1, wherein the clamping lock includes a lower portion calibrated on a internal diameter of a balancing element of the disc so as to ensure an axial centering of this disc, this lower portion further including a rim for clamping the disc with the lower shield previously in position.

7. The tooling for producing scallops and fastening holes of the clamp of the disc by electrochemical machining according to claim 1, further comprising two annular seals mounted, on the one hand, between the upper shield and an upper disc clamp and, on the other hand, between an upper portion of the clamping lock and the die-sinking tool and allowing ensuring an electrolyte sealing during the die-sinking of the first and second cathodes.

8. A method for producing scallops and fastening holes of a disc clamp by electrochemical machining by means of a die-sinking tool comprising in a substantially cylindrical insulating body first and second coaxial conductive cathodes, the method including the following steps:
   a) positioning the die-sinking tool so that the first cathode is in the vicinity of an upper surface of the disc clamp to be machined;
   b) machining with the first cathode the scallops of the disc clamp by electrochemical machining by moving the die-sinking tool relative to the disc along the central axis of the substantially cylindrical insulating body until the second cathode of the die-sinking tool is positioned in the vicinity of an upper surface of said disc clamp to be machined;
   c) machining with the second cathode the holes of the disc clamp by electrochemical machining by moving the die-sinking tool relative to the disc along the central axis of the substantially cylindrical insulating body.

9. A method for producing scallops and fastening holes of a disc clamp by electrochemical machining by means of a die-sinking tool comprising in a substantially cylindrical insulating body a first and a second coaxial conductive cathode, the method including the following steps:
   a) positioning the die-sinking tool so that the second cathode is in the vicinity of an upper surface of the disc clamp to be machined;
   b) machining with the second cathode the holes of the disc clamp by electrochemical machining by moving the die-sinking tool relative to the disc along the central axis of the substantially cylindrical insulating body until the first cathode of the die-sinking tool is positioned in the vicinity of an upper surface of said disc clamp to be machined;
   c) machining with the first cathode the scallops of the disc clamp by electrochemical machining by moving the die-sinking tool relative to the disc along the central axis of the substantially cylindrical insulating body.

10. The method for producing scallops and fastening holes of the disc clamp by electrochemical machining according to claim 8, wherein the lower and upper surfaces of the disc clamp, other than those involved in the method, are protected by respectively lower and upper shields each consisting of a rigid conductive part in direct contact with the surfaces to be protected and made of a material with better conductivity than the material of the disc clamp to be machined.

\* \* \* \* \*